United States Patent
Wycoff et al.

(10) Patent No.: US 8,631,663 B2
(45) Date of Patent: Jan. 21, 2014

(54) POWER FAILURE CONTROLLER FOR AN ELECTRONICALLY CONTROLLED EXPANSION VALVE IN A REFRIGERATION SYSTEM

(75) Inventors: Lyman Wycoff, Chester, VA (US); Larry Howington, Chesterfield, VA (US)

(73) Assignee: Hill Phoenix, Inc., Conyers, GA (US)

( * ) Notice: Subject to any disclaimer, the term of this patent is extended or adjusted under 35 U.S.C. 154(b) by 1018 days.

(21) Appl. No.: 12/702,962

(22) Filed: Feb. 9, 2010

(65) Prior Publication Data
US 2010/0280669 A1 Nov. 4, 2010

Related U.S. Application Data

(60) Provisional application No. 61/174,385, filed on Apr. 30, 2009.

(51) Int. Cl.
*F25B 49/00* (2006.01)
(52) U.S. Cl.
USPC .......................................................... 62/222
(58) Field of Classification Search
USPC ..................... 62/126, 127, 129, 222, 223
See application file for complete search history.

(56) References Cited

U.S. PATENT DOCUMENTS

| | | | |
|---|---|---|---|
| 4,765,150 A | 8/1988 | Persem | |
| 5,586,444 A | 12/1996 | Fung | |
| 6,321,548 B1 * | 11/2001 | Clarke et al. | 62/222 |
| 2008/0148751 A1 | 6/2008 | Swofford | |
| 2009/0133416 A1 | 5/2009 | Swofford et al. | |
| 2009/0217686 A1 | 9/2009 | Bittner | |
| 2009/0293523 A1 | 12/2009 | Bittner et al. | |
| 2010/0023171 A1 | 1/2010 | Bittner et al. | |

* cited by examiner

*Primary Examiner* — Marc Norman
(74) *Attorney, Agent, or Firm* — Foley & Lardner LLP

(57) ABSTRACT

The present application relates to a power failure controller for an electronically controlled expansion valve in a refrigeration system. The valve is controlled by a valve controller configured to close the valve as a part of a power-up routine when the valve controller is first powered-up from a powered-down state. The power failure controller includes a circuit configured to allow the valve controller to enter the powered-down state when a power failure is detected and to subsequently provide power to the valve controller from a capacitor bank coupled to the circuit so that the valve controller conducts the power-up routine and closes or mostly closes the valve.

20 Claims, 8 Drawing Sheets

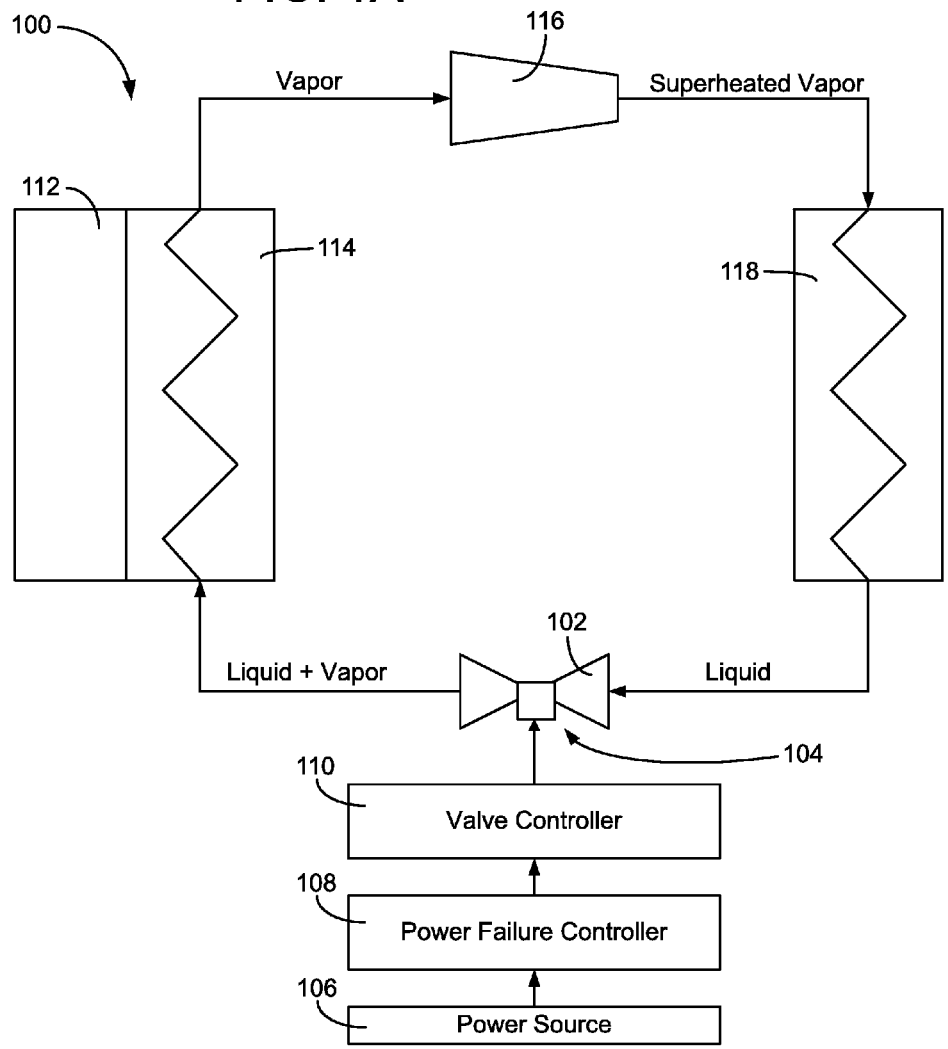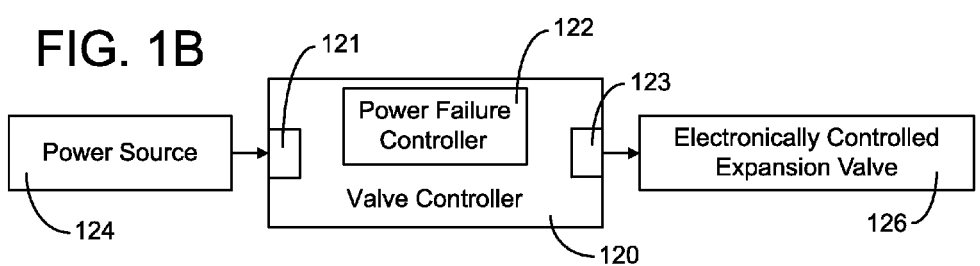

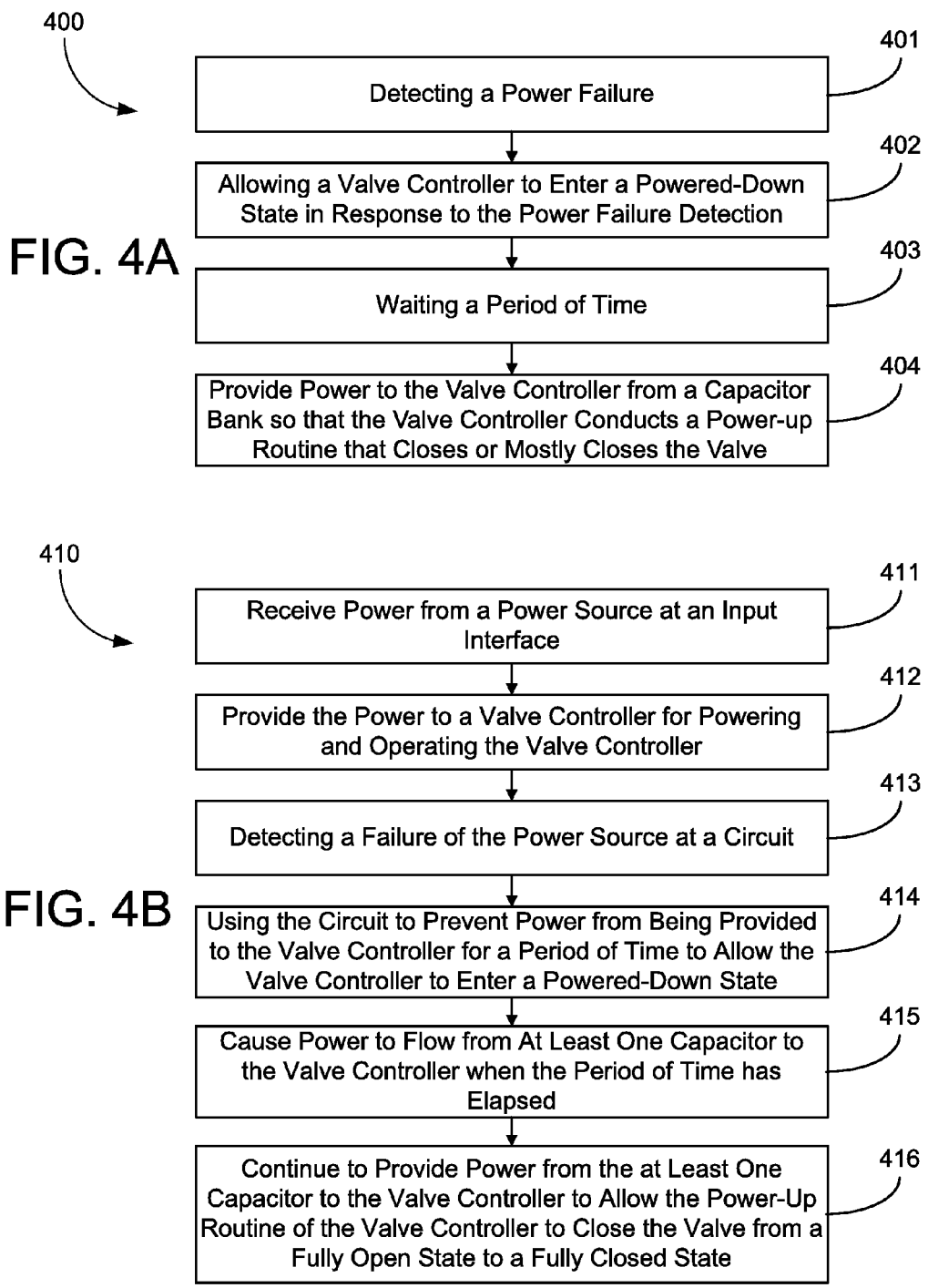

POWER FAILURE CONTROLLER FOR AN ELECTRONICALLY CONTROLLED EXPANSION VALVE IN A REFRIGERATION SYSTEM

CROSS-REFERENCE TO RELATED APPLICATIONS

The present application claims the benefit of U.S. Provisional Application No. 61/174,385, filed Apr. 30, 2009, which is incorporated herein by reference in its entirety.

BACKGROUND

The present disclosure generally relates to the field of electronically controlled valves. The present disclosure relates more specifically to a power failure controller for an electronically controlled expansion valve in a refrigeration system.

In some refrigeration systems, the expansion valve is electronically controlled. For example, an electronically controlled stepper motor may be configured to variably actuate the valve between an opened position and a closed position. The controller (i.e., control module, control circuit, etc.) that controls the motor can be configured to open or close the valve based on commands from an upstream control system, one or more feedback or feed forward loops utilizing temperature sensors, pressure sensors, or other inputs to the loop, or any other control logic activities. For example, the "Smart Valve" product sold by Hill Phoenix, Inc. automatically adjusts superheat to pre-determined target values based on the application (e.g., low or medium-temperature operation); it can automatically regulate the superheat in response to changing ambient conditions, system parameter changes, and refrigeration case load changes.

Applicants have identified a need to close the electronically controlled expansion valve in a controlled manner in the event of a power failure.

BRIEF DESCRIPTION OF THE FIGURES

The disclosure will become more fully understood from the following detailed description, taken in conjunction with the accompanying figures, wherein like reference numerals refer to like elements, in which:

FIG. 1A is a block diagram of a refrigeration system having an electronically controlled expansion valve, the operation of which is configured to be affected by a power failure controller via a valve controller, according to an exemplary embodiment;

FIG. 1B is a simplified block diagram of a refrigeration system having an electronically controlled expansion valve, the operation of which is configured to be affected by a power failure controller integrated with the valve controller, according to an exemplary embodiment;

FIG. 4A is a flow chart of a process for handling a power failure in a refrigeration system having an electronically controlled expansion valve, according to an exemplary embodiment;

FIG. 4B is a flow chart of a process for handling a power failure in a refrigeration system having an electronically controlled expansion valve, according to another exemplary embodiment;

SUMMARY

Figure 2A:
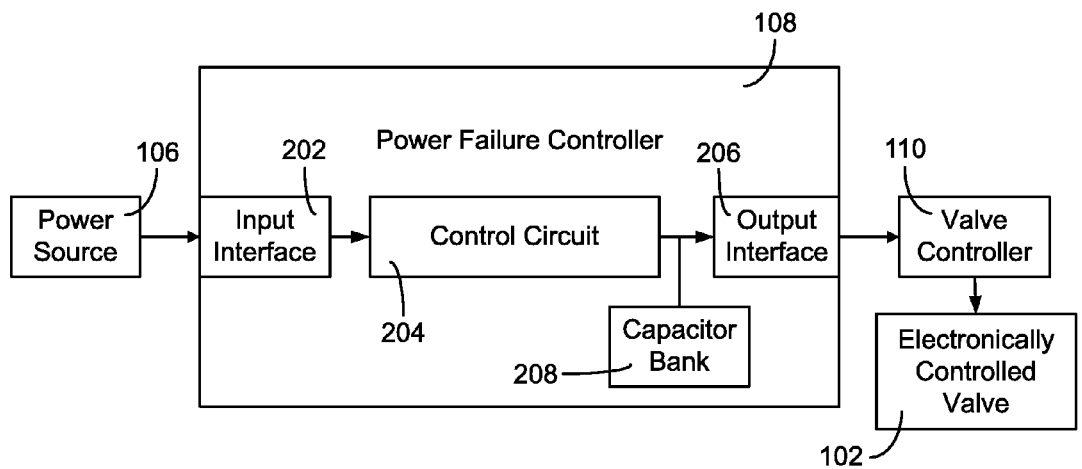
FIG. 2A is a more detailed block diagram of a power failure controller, according to the exemplary embodiment of FIG. 1A.

One embodiment of the disclosure relates to a power failure controller for an electronically controlled expansion valve in a refrigeration system. The valve controlled by a valve controller configured to close the valve as a part of a power-up routine when the valve controller is first powered-up from a powered-down state. The power failure controller includes a circuit configured to allow the valve controller to enter the powered-down state when a power failure is detected and to subsequently provide power to the valve controller from a capacitor bank coupled to the circuit so that the valve controller conducts the power-up routine and closes or mostly closes the valve.

Another embodiment of the disclosure relates to a method for handling a power failure in a refrigeration system having an electronically controlled expansion valve controlled by a valve controller configured to close the valve as a part of a power-up routine when the valve controller is first powered-up from a powered-down state. The method includes receiving power from a power source and providing the power to the valve controller for powering and operating the valve controller. The method further includes preventing power from being provided to the valve controller for a period of time to allow the valve controller to enter the powered-down state when a power failure of the power source is detected. The method also includes causing power to flow from at least one capacitor to the valve controller when the period of time has elapsed. The method yet further includes continuing to provide power from the at least one capacitor to the valve controller to allow the power-up routine of the valve controller to close the valve from a fully open state to a fully closed state.

Another embodiment of the disclosure relates to a power failure controller for an electronically controlled expansion valve in a refrigeration system. The valve is controlled by a valve controller configured to close the valve as a part of a power-up routine when the valve controller is first powered-up from a powered-down state. The power failure controller includes an input interface configured to receive power from a power source and at least one energy storage device (e.g., capacitor, capacitor bank, etc.) configured to charge via power received from the power source via the interface. The power failure controller further includes an output interface configured to provide power to the valve controller for powering and operating the valve controller. The power failure controller yet further includes a circuit configured to discontinue the provision of power to the valve controller when the voltage of the power received at the input interface drops below a threshold. The circuit is configured to prevent power from being provided from to the valve controller for a period of time to allow the valve controller to enter the powered-down state. The circuit is further configured to cause power to flow from the at least one energy storage device to the output interface when the period of time has elapsed. The circuit is further configured to continue providing power from the at least one energy storage device to the output interface to allow the power-up routine of the valve controller to close the valve from a fully open state to a fully closed state.

Yet another embodiment relates to a valve controller for an electronically controlled expansion valve in a refrigeration system. The valve controller includes a first circuit configured to open and close the valve according to a control algorithm, wherein the first circuit is configured to close the valve as a part of a power-up routine when the first circuit is first powered-up from a powered-down state. The valve controller further includes a power failure controller configured to allow the first circuit to enter the powered-down state when a power failure is detected and to subsequently provide power to the first circuit from a capacitor bank coupled to the power failure controller so that the first circuit conducts the power-up routine and closes or mostly closes the valve.

Alternative exemplary embodiments relate to other features and combinations of features as may be recited in the claims.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Applicants have identified a need to close the electronically controlled expansion valve in a controlled manner in the event of a power failure. During a power failure of a refrigerator system or a primary power source of a valve controller, it is advantageous to close the expansion valve to protect the refrigeration system's compressor elements from being provided liquid (rather than vapor) due to the expansion valve being too far open (the pressure differential between the expansion valve's inlet and outlet not being high enough). Referring generally to the Figures, a power failure controller for an electronically controlled expansion valve in a refrigeration system is shown and described. The valve is controlled by a valve controller configured to close the valve as a part of a power-up routine when the valve controller is first powered-up from a powered-down state. The power failure controller includes a circuit configured to allow the valve controller to enter the powered-down state when a power failure is detected. The power failure controller subsequently provides power to the valve controller from a capacitor bank coupled to the circuit so that the valve controller conducts the power-up routine and closes the valve.

Referring now to FIG. 1A, a block diagram of a refrigeration system 100 having an electronically controlled expansion valve 102 ("the valve") is shown. A power source 106 (AC or DC) provides power to valve controller 110 via power failure controller 108. Valve controller 110 provides control signals and power to valve 102 and more particularly, as shown, a motor 104 or another electromechanical device of valve 102 that controllably actuates valve 102.

According to various exemplary embodiments, valve 102 is commercially available as a Sporlan ESX valve or a Sporlan Y1268 valve. The Sporlan ESX valve may include a motor that includes 200 steps and can change steps at a rate of 0.033 seconds per step. The Sporlan Y1268 valve may include a motor that includes 2500 steps and can change steps at a rate of 0.005 seconds per step. Accordingly, the Sporlan ESX valve can take about 6.6 seconds to close while the Sporlan Y1268 valve can take about 12.5 seconds to close. It should be appreciated that in various other embodiments valve 102 can include a motor 104 having different parameters.

Refrigeration system 100 is shown as a direct expansion type system that directly provides cooling to a cooling load 112 (e.g., the evaporator 114 cools a refrigerator case). In other embodiments, a first coolant may circulate through a vapor compression cycle (including compressor 116 and condenser 118) such as that shown in FIG. 1A, but evaporator 114 interacts with a second coolant circulating in another loop (e.g., secondary coolant loop) that removes heat from one or more cooling loads.

It should be appreciated that while the electronically controlled valve described in this disclosure serves as an expansion valve for a refrigeration system (e.g., as shown in FIG. 1A), the power failure controllers and methods described herein could be applied to any valve or valve controller to ensure that the valve is returned to a default position in the event of a power failure.

According to an exemplary embodiment, valve controller 110 is a "Smart Valve" controller sold by Hill Phoenix, Inc. Valve controller 110 may be configured to close valve 102 as a part of a power-up routine when valve controller 110 is first powered-up from a powered-down state. Once the power-up routine is over, the primary control algorithm for valve controller 110 may begin opening valve 102 (e.g., based on temperature readings, pressure readings, optimal valve opening calculations, etc.). Power failure controller 108 is configured to allow valve controller 110 to enter the powered-down state when a power failure of power source 106 is detected or otherwise occurs. After delaying to allow valve controller 110 to enter the powered-down state, power failure controller 108 then begins providing power to valve controller 110 from a back-up power source (e.g., a capacitor bank) coupled to power failure controller 108. Power failure controller 108 is configured to time its activity so that valve controller 110 conducts the power-up routine and closes valve 102. Once power failure controller 108 provides power to valve controller 110 that is expected to close valve 102, power failure controller 108 again discontinues power to valve controller 110 (e.g., prior to the power-up routine completing or entering a phase that would begin to open valve 102 again).

In FIG. 1A, power failure controller 108 and valve controller 110 are not integrated (e.g., not contained within the same housing, not contained on the same circuit board, etc.) and power failure controller 108 is configured to be "between" power source 106 and valve controller 110. In this embodiment, the power cord that normally connects power source 106 to valve controller 110 is received by power failure controller 108. The power from power source 106 is passed from power failure controller 108 to valve controller 110 and also powers the power failure controller 108. Power failure controller 108 acts on valve controller 110 by controllably removing or providing power to valve controller 110.

FIG. 1B illustrates an alternative embodiment in which power failure controller 122 is integrated with valve controller 120. Power source 124 is connected to a power input 121 of valve controller 120 and power failure controller 122 is incorporated on, as a part of, or within valve controller 120. Power failure controller 122 of FIG. 1B may be hardwired between the power input interface 121 of valve controller 120 and logic circuitry for valve controller 120. Such a power failure controller may be housed within the same casing or housing as circuitry for valve controller 120. Power is provided to electronically controlled expansion valve 126 via a connection from power output 123.

Referring now to FIG. 2A, a more detailed block diagram of power failure controller 108 of FIG. 1A is shown, according to an exemplary embodiment. Power failure controller 108 is shown to include an input interface 202. Input interface 202 may include a terminal, one or more solder points, a jack, or any other electrical coupling. Input terminal 202 may also include a power transformer, a rectifier, smoothing circuitry, or other electrical components to change, step-up, step-down, or otherwise affect the power received from power source 106 for use by control circuit 204 or for providing on to output interface 206. Output interface 206 can be the same or a different type of terminal or electrical coupling relative to input interface 202. Capacitor bank 208 is shown as being in series between control circuit 204 and output interface 206, but according to various other embodiments may be in parallel with control circuit 204 or otherwise situated.

Figure 2B:
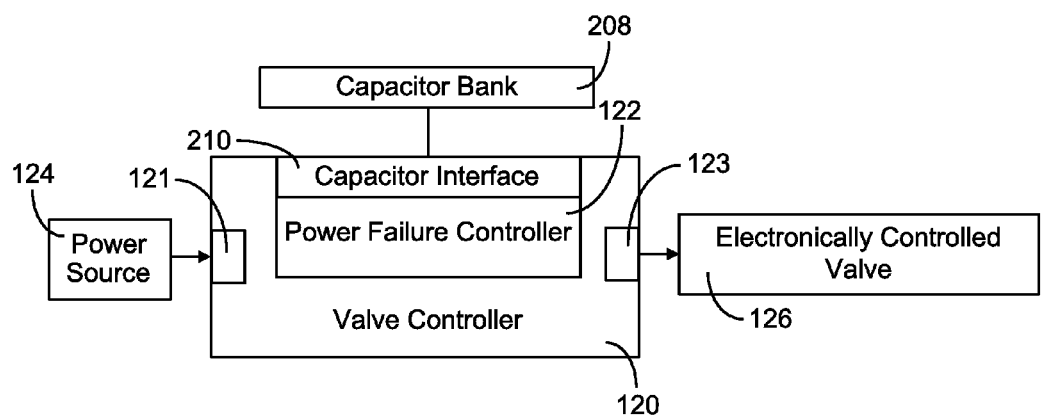
FIG. 2B is a more detailed block diagram of a power failure controller, according to the exemplary embodiment of FIG. 1B.

Referring now to FIG. 2B, a more detailed block diagram of valve controller 120 of FIG. 1B is shown, according to an exemplary embodiment. Valve controller 120 in FIG. 2B is shown to include a capacitor interface 210 for coupling power failure controller 122 to external capacitor bank 208. Capacitor interface 210 may allow the optional coupling and decoupling of capacitor bank 208 from power failure controller 122 and valve controller 120. According to an exemplary embodiment, when capacitor bank 208 is decoupled from capacitor interface 210 then power failure controller 122 passes power through to valve controller 120 without conducting its power failure logic. In another exemplary embodiment, when capacitor bank 208 is decoupled from capacitor interface 210, power failure controller 122 includes logic that is configured to switch power provided to valve controller 120 or electronically controlled valve 126 "off" in a controlled manner if power supply voltage falls below a certain threshold or is too unstable, but is otherwise transparent to the operation of the system.

Figure 3A:
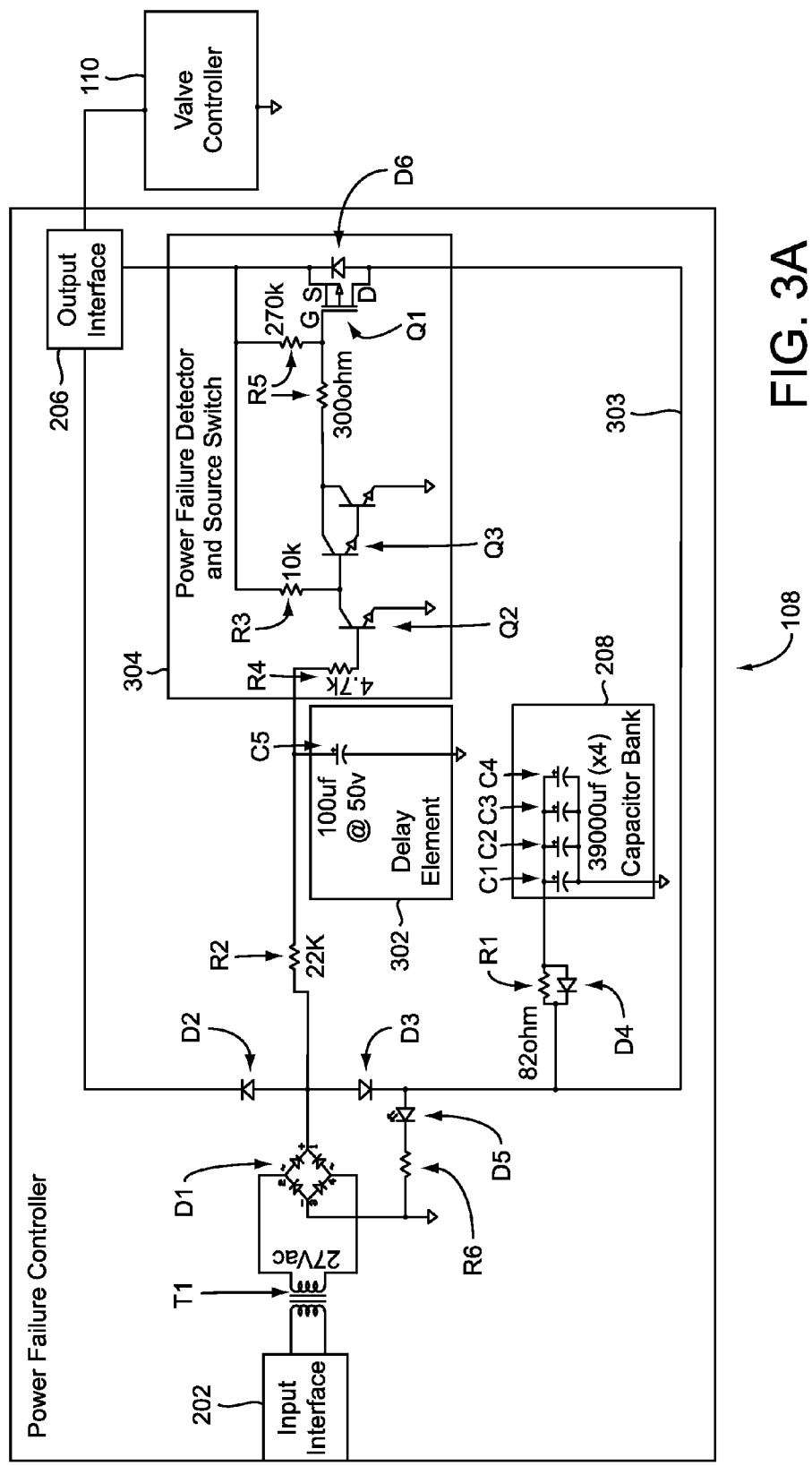
FIG. 3A is a circuit schematic of a power failure controller, according to an exemplary embodiment.

Referring now to FIG. 3A, a circuit schematic of power failure controller 108 is shown, according to an exemplary embodiment. The circuit schematic includes transformer T1 which may be configured to step down, for example, standard 120V AC "mains" power received at input interface 202 to a voltage range acceptable to valve controller 110 (e.g., a 24 vdc-32 vdc range acceptable to a "Smart Valve Superheat Controller" sold by Hill Phoenix, Inc.) via output interface 206. In alternative embodiments the power may not be stepped down or otherwise transformed for output to valve controller 110.

A diode bridge D1 is shown to receive the secondary winding of transformer T1 and converts the alternating current (AC) input into direct current (DC). During normal operation where power failure controller 108 provides the power that valve controller 110 uses for operation, the voltage from the diode bridge is biased forward through diode D2 directly to the valve controller 110's power supply input via output interface 206. Valve controller 110 will operate normally while mains power is sufficiently available. It should be appreciated that many different power input stages, filtering stages, soft-start stages, circuits, or other components may be provided in controller 108 depending on the power source, the particular design of components after the power input stage, and the inputs acceptable to the valve controller.

When sufficient power is available at input interface 202, power failure controller 108 routes power through diode D3 and charges capacitor bank 208 defined by capacitors C1-C4 via current limiting resistor R1. Capacitor bank 208 stores power for later use during a power failure event.

Referring still to the circuit shown in FIG. 3A, during normal operation, Q2 (e.g., an NPN silicon transistor, a bipolar silicon transistor, etc.) and Q3 (e.g., an NPN silicon transistor, a Darlington silicon transistor, etc.) are activated, which cause Q1 (e.g., a J-FET transistor, etc.) to be deactivated during normal operation. Accordingly, Q1 normally operates to disallow power from flowing through diode D6 to output interface 206 and valve controller 110. In other words, power failure detector and source switch 304 generally and Q1 more particularly are configured to disallow current flow from capacitor bank 208 to output interface 206 via path 303 when sufficient power is available at input interface 202.

Q2 and Q3, part of the power failure detector and source switch portion 304 of the circuit, are configured to detect a power failure and to cause a switch from providing mains power to valve controller 110 to providing power from capacitor bank 208 to valve controller 110. According to the embodiment shown in FIG. 3A, Q2 and Q3 are deactivated when insufficient voltage is available at their base input. When Q2 and Q3 are deactivated, pull-up resistors R5 will subsequently activate Q1 which provides a path for voltage from capacitor bank 208 to output interface 206 via diodes D4 and D6.

According to an exemplary embodiment, the supply of power from capacitor bank 208 to valve controller 110 is delayed via one or more delay elements 302. In FIG. 3A, capacitor C5 of delay element 302 which charges and remains charged when the primary source of power is available. At power failure (e.g., where power from the primary power source dips), delay element 302 provides a controlled delay period where no power is allowed from power failure controller 108 to valve controller 110. For example, in the embodiment shown in FIG. 3A, power failure controller 108, via capacitor C5 of delay element 302, brings and holds valve controller 110 in a powered-down state (e.g., for ~3 seconds, for a period of time expected to result in complete shut-down of the valve controller's circuitry, etc.). During this time, capacitor C5 of delay element 302 keeps Q2 and Q3 activated which maintains Q1 as deactivated until the charge level of capacitor C5 is depleted. Once capacitor C5 of delay element 302 is depleted, Q2 and Q3 are deactivated and the process for switching from the primary power source to the backup power provided by capacitor bank 208 is begun. During the discharge of the capacitor bank 208 to valve controller 110, capacitor C5 is isolated and prevented from recharging with the power from capacitor bank 208 via diodes D2 and D3, preventing undesirable transistor-transistor logic switching of Q2 and Q3.

According to an exemplary embodiment, capacitor bank 208 is sized to provide just enough power to valve controller 110 to allow valve controller 110 to completely close the valve during a power-up routine after a power failure. According to an exemplary embodiment, the backup power supplied by capacitor bank 208 remains at or above a minimum voltage range for valve controller 110 to conduct the power-up routine (or a portion of the power-up routine) of a particular valve. For example, a Sporlan ESX valve may require voltage to be applied at or above 10 vdc for approximately 6.6 seconds while the Sporlan Y1268 valve may require voltage to be applied at or above 10 vdc for approximately 12.5 seconds for the valve to close and fully seat. In some embodiments the backup power provided by capacitor bank 208 expires after completion of the power-up routine (e.g., to ensure complete closure) and during a data acquisition routine prior to valve controller 110 acting on the data acquired. For example, for the Smart Valve Superheat Controller sold by Hill Phoenix, Inc., the backup power may be configured to expire during a valve overdrive period (e.g., the last 20%-30% of the valve closing time may be dedicated to overdriving the valve to ensure it is fully seated). In other exemplary embodiments the backup power may be configured to expire after the overdrive period but prior to the end of a subsequent period (e.g., during an initial superheat control acquisition cycle) before the valve is caused to be reopened by the logic of the valve controller. In other words, capacitor bank 208 and the individual capacitors that make up capacitor bank 208 are preferably selected and sized to provide only enough power for controller 108 to mostly close, close, or close and overdrive (i.e., fully seat) the electronic valve. Backup power is discontinued before logic of valve controller 110 can automatically begin re-opening the valve for normal system operation. In some embodiments, power failure controller 108 is configured to supply timed power to only mostly close the valve during a power failure event. In other embodiments, power failure controller 108 is configured to fully close the valve but discontinues power before fully seating the valve or beginning an overdrive activity.

As few as one capacitor may be selected if appropriate for the application. Further, while a capacitor bank is one way of storing and providing backup power to the circuit, it should be noted that other charging circuits, discharge circuits, and backup power elements may be alternatively used (e.g., lithium-ion battery cells, a solar power system, a gas generator, etc.). Further, it should be noted that all of the values shown in FIG. 3A and the other Figures are exemplary only and that the scope of the present disclosure is intended to cover different circuit designs, different component values, and the like. One of skill in the art will appreciate, for example, that different values for the circuit elements shown in FIG. 3A would need to be selected if T1 were configured to output a different power range or if the valve controller 110 were to have different characteristics. For example, according to the exemplary embodiment shown in FIG. 3A, the target charge level for capacitor bank 208 is 31.8 vdc, with an initial charge time of two minutes and two seconds and a recharge time of one minute and forty-four seconds. According to one embodiment, the power-failure off time provided by delay element 302 may be approximately 3.8 seconds (during which valve controller 110 is expected to enter a powered down state) and the power-fail on time (provided by the backup power) is expected to be 9.3 seconds for a Sporlan ESX valve. Capacitor bank 208 values may be changed to provide for a 13.4 second backup on time for a Sporlan Y1268 valve (e.g., in 13.4 seconds the valve controller 110 is expected to close and fully seat the Sporlan Y1268 valve but not to have begun re-opening the valve based on operational logic).

Figure 3B:
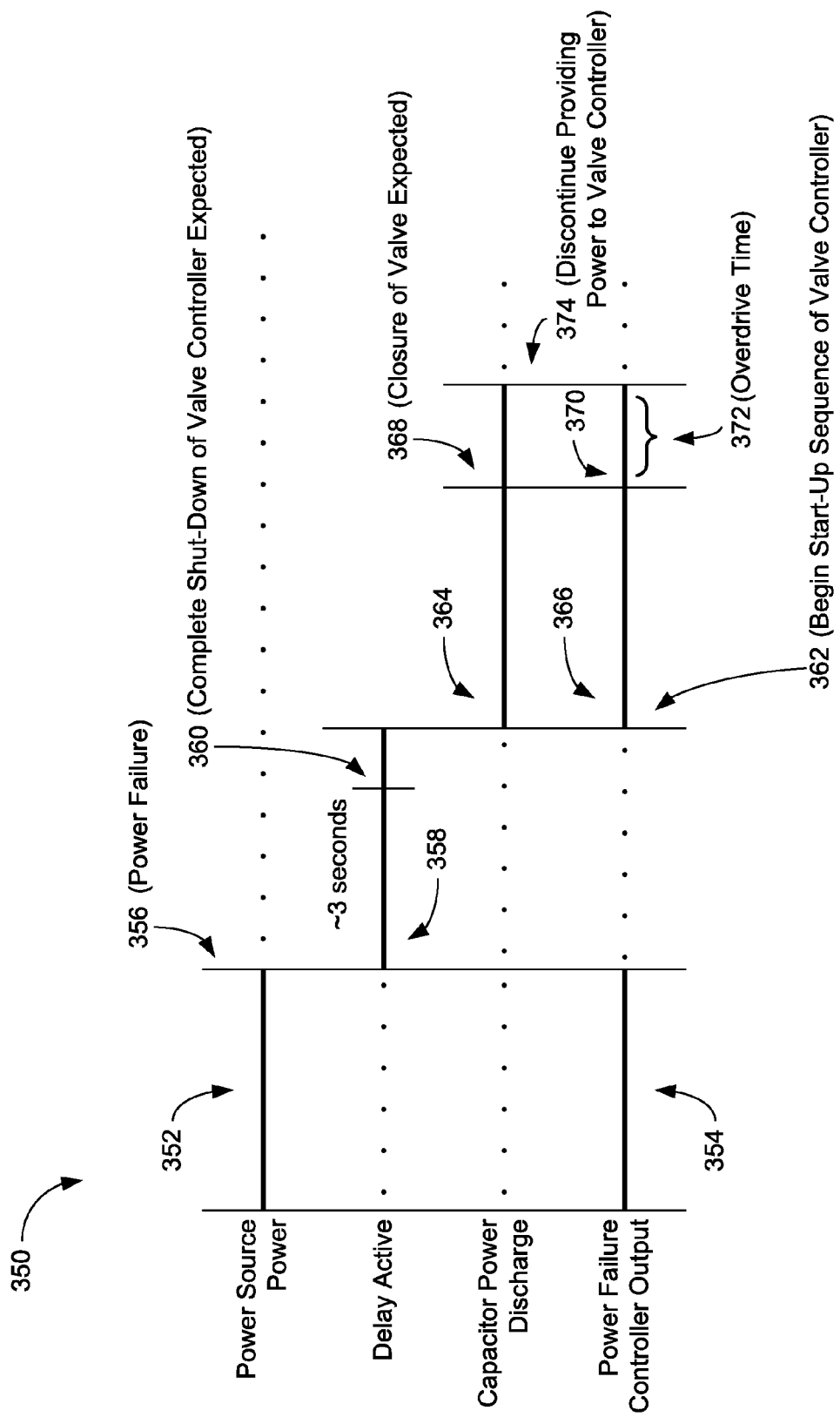
FIG. 3B is a state diagram illustrating an exemplary operation sequence of the power failure controller shown in FIG. 3A.

FIG. 3B is a state diagram illustrating an exemplary operation sequence 350 of the power failure controller shown in FIG. 3A. With reference to both FIGS. 3A and 3B, at state 352 power is being provided by the power source to power failure controller 108 (e.g., a power failure is not occurring). When state 352 is active, the power failure controller routes the power from the power source to valve controller 110 (e.g., via diode D2) and capacitor bank 208 is held in a charging or charged state. When power failure occurs at stage 356, the power source power is no longer available. During time 358, delay element 302 prevents power failure detector and source switch 304 from allowing power failure controller 108 to provide backup power to valve controller 110. At some time 360 during delay 358 a complete shut-down of valve controller 110 is expected. When delay 358 expires (via delay element 302), power failure detector and source switch 304 conducts its detection and switching activities. At time 362, switch 304 causes capacitor power discharge 364 to provide the power failure controller output 366 to valve controller 110. When power is again supplied to valve controller 110 after the complete shut-down of the valve controller (e.g., at time 360), a start-up sequence of the valve controller is begun (time 362). As explained above, the circuitry of power failure controller 108 and/or the parameters of capacitor bank 208 may be configured to provide power past the time 368 when closure of the valve is expected. The power failure controller at stage 370 is illustrated as providing power to the valve controller during an "overdrive time" 372—when valve controller 110 is expected to use the backup power to overdrive the valve. When the capacitors of capacitor bank 208 are fully discharged at time 374, power is no longer provided to valve controller 110 and the valve is expected to cease movement to remain closed (or mostly closed) during the remainder of the power failure.

As mentioned above, in some exemplary embodiments the timing of capacitor power discharge 364 may be different. In an exemplary embodiment, capacitor power discharge 364 is only configured to mostly close the valve (e.g., 80% of the maximum closing time for the valve) but then stops and allows pressure acting against an overseat-configured valve to complete the closing of the valve. The end result of such a strategy will likely be full closure of the valve with less backup energy use than would otherwise be required to close the valve. Accordingly, in some embodiments capacitor bank 208 may be undersized to account for the pressure-assisted closure that an overseat configuration is estimated to provide. An overdrive time 372 may be used when the valve is in an under-seat configuration and pressure may be acting against closure of the valve.

Referring now to FIG. 4A, a flow chart of a process 400 for handling a power failure in a refrigeration system having an electronically controlled expansion valve is shown, according to an exemplary embodiment. Process 400 is shown to include detecting a power failure (step 401) and allowing the valve controller to enter a powered-down state in response to detecting the power failure (step 402). Process 400 further includes waiting a period of time with the valve controller in the powered-down state (step 403). Power is then provided to the valve controller from a capacitor bank so that the valve controller conducts a power-up routine that closes the valve (step 404) (or mostly closes the valve).

Referring now to FIG. 4B, a more detailed flow chart of a process 410 for handling a power failure in a refrigeration system having an electronically controlled expansion valve is shown, according to an exemplary embodiment. Process 410 is shown to include receiving power from a power source (step 411) and providing the power to the valve controller (step 412). The valve controller may be configured to close the valve as a part of a power-up routine when the valve controller is first powered-up from a powered-down state. Process 410 further includes detecting a failure of the power source at a circuit (step 413). Process 410 is yet further shown to include using the circuit to prevent power from being provided to the valve controller for a period of time (step 414). This discontinuation of power to the valve controller allows the power controller to enter a powered-down state. Process 410 is further shown to include causing power to flow from at least one capacitor to the valve controller when the period of time has elapsed (step 415). The circuit continues to provide power from the at least one capacitor to the valve controller to allow the power-up routine of the valve controller to fully close the valve (step 416). The circuit may be configured to maintain the power supplied from the at least one capacitor to the valve controller for a period of time prior to the normal operational logic of the valve controller taking over and opening the valve based on the operational logic. In some embodiments capacitor sizing may be calculated to provide this timing. In other embodiments, a timing circuit may be provided to stop power from being provided to the valve controller from the capacitors after the period of time, even if the capacitors are not depleted. In yet other embodiments, the capacitors may be sized to be depleted within the period of time but a timing circuit may be provided to the circuit to shut off the power as a protection measure. In still yet other embodiments feedback from the valve controller, the valve actuator, or another sensor may be used by the power failure controller to actively determine when to discontinue providing backup power to the valve controller. Detecting the power failure may include observing the power received from the power source drop below a threshold voltage.

Figure 5:
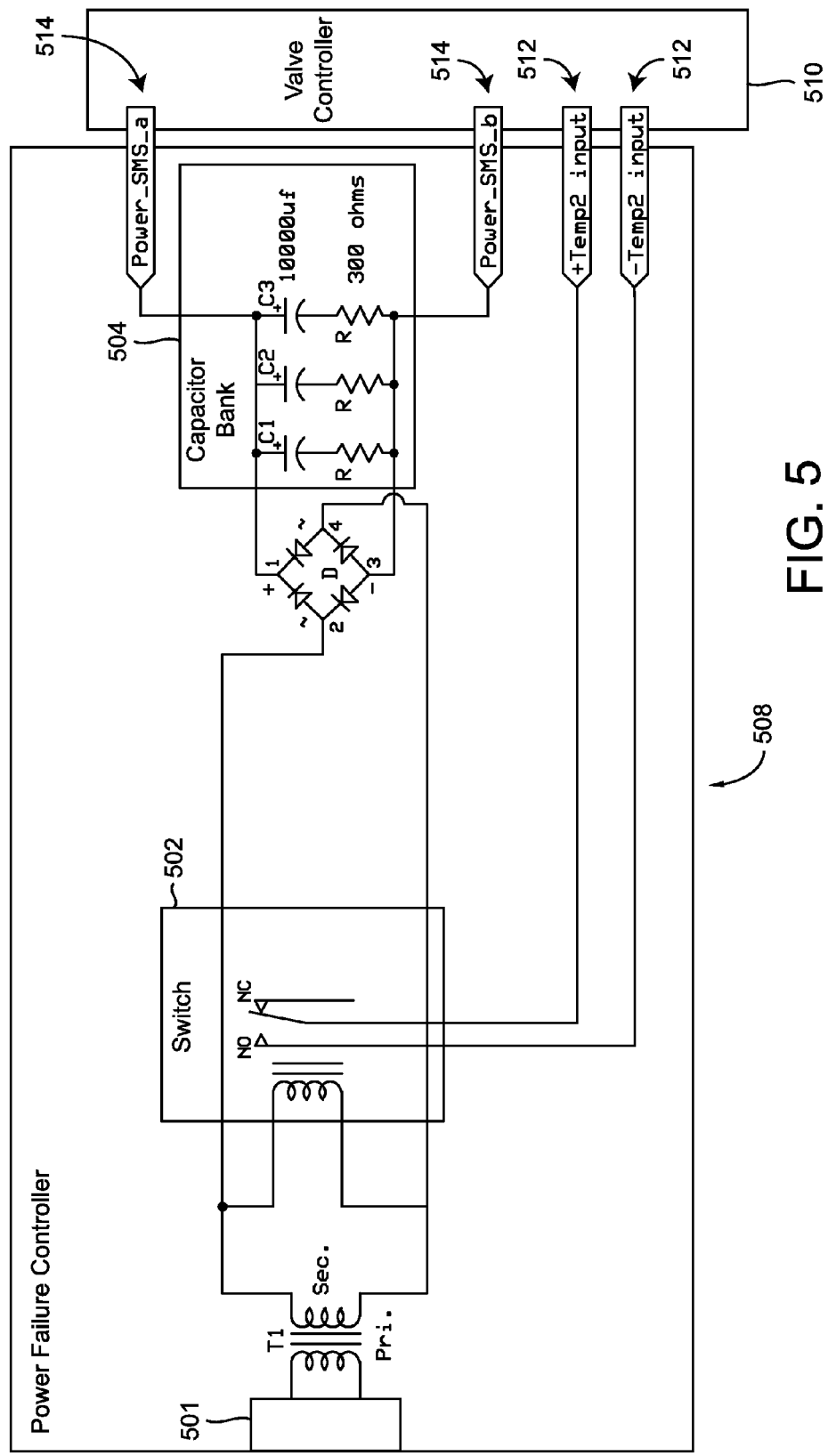
FIG. 5 is a circuit schematic of a power failure controller, according to an alternative exemplary embodiment.

Referring now to FIG. 5, a circuit schematic of a power failure controller 508 is shown, according to an alternative exemplary embodiment. This circuit operates by changing a signal provided to a control signal input 512 of valve controller 510 rather than by interrupting power provided to the smart valve controller. For example, signal inputs 512 (+temp2 and −temp2) may correspond with, e.g., temperature sensor inputs of valve controller 510 that, when changed, signal a condition or set of conditions to the valve controller which causes valve controller 510 to close the valve. The circuit of FIG. 5 may operate in cooperation with one or more circuit elements or logic algorithms (e.g., implemented in computer code) added to valve controller 510. For example, valve controller 510 may be modified to interpret the behavior of +temp2 and −temp2 in the event of a power failure as indicating a power failure state and may include logic for forcing a power-down state or to controllably close the valve in response to the power failure. In other embodiments, valve controller 510 responds normally to inputs 512 (e.g., the valve controller treats inputs 512 as temperature sensor inputs) and power failure controller 508 selects temperature sensor values known to cause valve controller 510 to immediately close the valve. During a power failure state, power is provided by capacitor bank 504 to the valve controller 510 via power inputs 514 (e.g., "Power_SMS_a" and "Power_SMS_b") and is not discontinued. In the embodiment shown in FIG. 5, power provided to valve controller 510 is not interrupted by the circuit until capacitor bank 504 is depleted. It should be noted that the embodiment details shown in FIG. 5 and the specific values of the circuitry elements may vary according to different applications. For example, the charging time constant for the resistors/capacitors may be approximately 3000 milliseconds and the DC current limiting per capacitor may be approximately 100 milliamps. In an alternative embodiment, the activity of the power failure controller (e.g., the signals provided by +temp2 and −temp2 to valve controller 510) are controlled by a microprocessor and/or by software stored in memory of the microprocessor. In the example shown in FIG. 5, a switch 502 coupled to inputs 512 (e.g., via a cable, wire or wires) changes states (e.g., closes, opens) when power is available or not available from power input 501.

Figure 6:
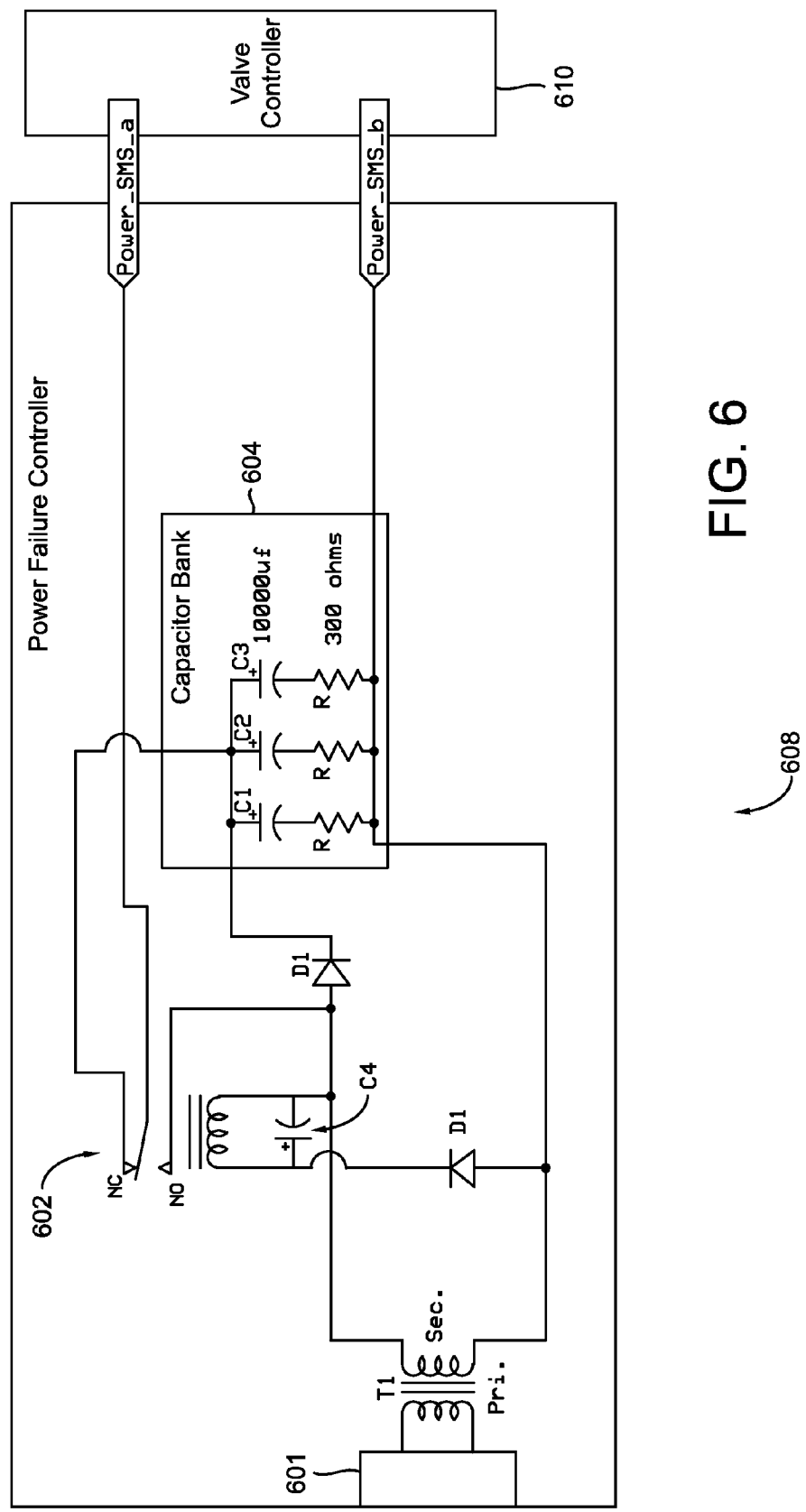
FIG. 6 is a circuit schematic of a power failure controller, according to another alternative exemplary embodiment.

Referring now to FIG. 6, a circuit schematic of power failure controller 608 is shown, according to another alternative exemplary embodiment. In FIG. 6, a normally closed relay 602 (the relay is shown in a de-energized state in FIG. 6) is held open when power is available from the primary power source (e.g., and at input interface 601). Relay 602 being held open (entering and staying in an energized state) causes power to be provided to valve controller 610 from the primary power source (via "Power_SMS_b" instead of "Power_SMS_a"). Capacitor C4 charges and remains charged when power is available from the primary power source. When a power failure occurs, energy from C4 holds relay 602 open (in an energized state) but power is not provided to valve controller 610—causing valve controller 610 to enter and remain in a powered-down state. When C4 is depleted, the normally closed relay 602 is de-energized and closes (to the position shown in FIG. 6), causing power to be supplied to valve controller 610 from capacitor bank 604 for a period of time (i.e., until the capacitors are depleted). Capacitor bank 604 may be sized to ensure that the power-up routine of valve controller 610 runs to the extent necessary to close the valve. The embodiment details shown in FIG. 6 and the specific values of the circuitry elements may vary according to different applications. For example, the time delay for capacitor C4 may be approximately one second, the charging time constant for capacitors C1-3 may be approximately 3000 milliseconds, and the DC current limiting per capacitor may be approximately 100 milliamps to correspond with valve controller 610 characteristics. If different valves or valve controllers are used, the values of components in the circuit may change appropriately and the circuit will still be considered within the scope of the present disclosure.

Figure 7:
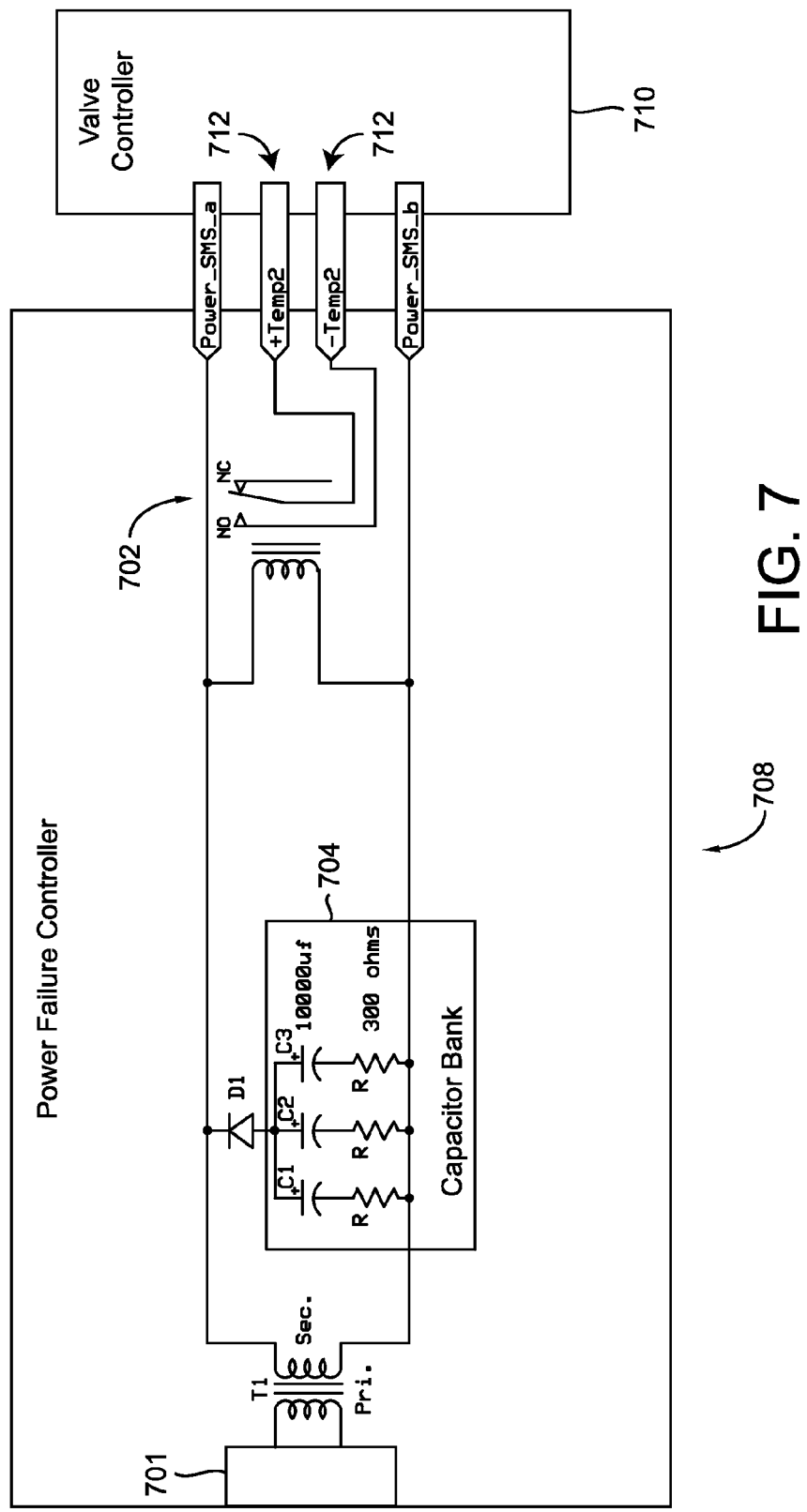
FIG. 7 is a circuit schematic of a power failure controller, according to yet another alternative exemplary embodiment.

Referring now to FIG. 7, a circuit schematic of power failure controller 708 is shown, according to yet another alternative exemplary embodiment. Power failure controller 702 of FIG. 7 operates similarly to the power failure controller of FIG. 5 in that power is supplied to the valve controller from capacitor bank 704 immediately in the event of any power failure of the primary power source at input interface 701—power to valve controller 710 is not immediately discontinued. Relay 702 holds control signal inputs 712 provided to the valve controller 710 in a first state when power is available to relay 702 and in a second state when power is not available to relay 702. In this embodiment, valve controller 710 may include circuitry or logic for handling changes in control signal inputs 712 to cause the valve to close or mostly close using the power supplied from capacitor bank 704. In the embodiment shown in FIG. 7, alternating current (AC) is provided to valve controller 710 and relay 702 holds signal inputs 712 in a first state as long as the AC is provided from input 701. When direct current (DC) is supplied by capacitor bank 704, signal inputs 712 change states to signal to valve controller 710 that the valve should be closed due to a power failure condition.

The construction and arrangement of the systems and methods as shown in the various exemplary embodiments are illustrative only. Although only a few embodiments have been described in detail in this disclosure, many modifications are possible (e.g., variations in sizes, connections, proportions of the various elements, values of parameters, mounting arrangements, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. For example, while some of the Figures described herein do not include a microcontroller and provide the advantages of simplicity and low cost using only discrete components and not requiring any changes to the valve controller, it should appreciated that a microcontroller may be included in any of the various circuits for conducting switching, timing, or other logic activities. For example, the logic provided by the transistor configuration in FIG. 3A could alternatively be implemented in a microcontroller or integrated circuit. Accordingly, embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. The logic or machine-executable instructions may also be transferred or provided over a network or another communications connection (e.g., to receiving elements in the power failure controller or the valve controller) and the connection may be viewed as a machine-readable medium. Thus, any such connection is properly termed a machine-readable medium. Combinations of the above are also included within the scope of machine-readable media. Machine-executable instructions include, for example, computer code, instructions and data which cause a general purpose computer, special purpose computer, or special purpose processing machines to perform a certain function or group of functions. Two or more steps may be performed concurrently or with partial concurrence. Such variation will depend on the software and/or hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A power failure controller for an electronically controlled expansion valve in a refrigeration system, the valve controlled by a valve controller configured to close the valve as a part of a power-up routine when the valve controller is first powered-up from a powered-down state, the power failure controller comprising:
a circuit configured to allow the valve controller to enter the powered-down state when a power failure is detected and to subsequently provide power to the valve controller from a capacitor bank coupled to the circuit so that the valve controller conducts the power-up routine and closes or mostly closes the valve, wherein allowing the valve controller to enter the powered-down state comprises preventing power from being provided to the valve controller from the capacitor bank.

2. The power failure controller of claim 1, wherein the circuit does not include a microcontroller.

3. The power failure controller of claim 2, wherein the circuit is comprised entirely of discrete solid state components.

4. The power failure controller of claim 3, wherein the circuit is configured to hold the valve controller in the powered-down state prior to providing power from the capacitor bank to the valve controller.

5. The power failure controller of claim 4, wherein the capacitor bank is sized to discontinue providing power to the valve controller after the valve has closed but prior to the valve controller implementing control logic that normally opens the valve.

6. A method for handling a power failure in a refrigeration system having an electronically controlled expansion valve controlled by a valve controller configured to close the valve as a part of a power-up routine when the valve controller is first powered-up from a powered-down state, the method comprising:
receiving power from a power source and providing the power to the valve controller for powering and operating the valve controller;
preventing power from being provided to the valve controller for a period of time to allow the valve controller to enter the powered-down state when a power failure of the power source is detected;
causing power to flow from at least one capacitor to the valve controller when the period of time has elapsed; and
continuing to provide power from the at least one capacitor to the valve controller to allow the power-up routine of the valve controller to close the valve from a fully open state to a fully closed state.

7. The method of claim 6, wherein detecting the power failure comprises observing the power received from the power source drop below a threshold voltage.

8. The method of claim 6, wherein the valve controller is configured to begin opening the valve when the power-up routine has completed and power is still being provided to the valve controller, and wherein the at least one capacitor is configured to discharge in a period of time corresponding with a completion of the power-up routine.

9. The method of claim 6, wherein the preventing, causing and continuing steps are controlled by a circuit comprised entirely of discrete solid state components.

10. A power failure controller for an electronically controlled expansion valve in a refrigeration system, the valve controlled by a valve controller configured to close the valve as a part of a power-up routine when the valve controller is first powered-up from a powered-down state, the power failure controller comprising:
an input interface configured to receive power from a power source;
at least one energy storage device configured to charge via power received from the power source via the interface;
an output interface configured to provide power to the valve controller for powering and operating the valve controller; and
a circuit configured to discontinue the provision of power to the valve controller when the voltage of the power received at the input interface drops below a threshold; wherein the circuit is configured to prevent power from being provided from to the valve controller for a period of time to allow the valve controller to enter the powered-down state, wherein the circuit is further configured to cause power to flow from the at least one energy storage device to the output interface when the period of time has elapsed, and wherein the circuit is further configured to continue providing power from the at least one energy storage device to the output interface to allow the power-up routine of the valve controller to close the valve from a fully open state to a fully closed state.

11. The power failure controller of claim 10, wherein the valve controller is configured to begin opening the valve when the power-up routine has completed and power is still being provided to the valve controller,
   wherein the at least one energy storage device is configured to discharge in a period of time corresponding with a completion of the power-up routine.

12. The power failure controller of claim 11, wherein the circuit does not include a microcontroller.

13. The power failure controller of claim 12, wherein the power provided to the valve controller by the output interface is the primary source of power for the valve controller.

14. The power failure controller of claim 10, wherein the period of time that power is prevented from being provided to the valve controller is controlled by a capacitor that holds at least one discrete logic element in a state that prevents current from flowing out of the energy storage device to the valve controller.

15. The power failure controller of claim 10, wherein the energy storage device is a capacitor bank sized so that power is calculated to be withdrawn from the valve controller after the valve has entered the fully closed state but before operational logic of the valve controller causes the valve to open based on one or more sensor inputs.

16. A valve controller for an electronically controlled expansion valve in a refrigeration system, the valve controller comprising:
   a first circuit configured to open and close the valve according to a control algorithm, wherein the first circuit is configured to close the valve as a part of a power-up routine when the first circuit is first powered-up from a powered-down state; and
   a power failure controller configured to allow the first circuit to enter the powered-down state when a power failure is detected and to subsequently provide power to the first circuit from a capacitor bank coupled to the power failure controller so that the first circuit conducts the power-up routine and closes or mostly closes the valve, wherein allowing the valve first circuit to enter the powered-down state comprises preventing power from being provided to the first circuit from the capacitor bank.

17. The valve controller of claim 16, further comprising a housing and wherein the first circuit and the power failure controller are enclosed within the housing together.

18. The valve controller of claim 16, wherein the power failure controller receives power from a primary power source and includes a capacitor interface for receiving backup power from a detachable capacitor bank.

19. The valve controller of claim 18, wherein power from the primary power source is provided to the valve controller via the power failure controller.

20. The valve controller of claim 19, wherein the power failure controller is configured to provide backup power when the capacitor bank is attached to the capacitor interface but allows normal operation of the valve controller when the capacitor bank is detached from the valve controller.

* * * * *